United States Patent [19]

Karttunen

[11] Patent Number: 5,412,567
[45] Date of Patent: May 2, 1995

[54] AUGMENTING A LEXICAL TRANSDUCER BY ANALOGY

[75] Inventor: Lauri Karttunen, Redwood City, Calif.

[73] Assignee: Xerox Corporation, Rochester, N.Y.

[21] Appl. No.: 999,736

[22] Filed: Dec. 31, 1992

[51] Int. Cl.$^6$ .............................................. G06F 15/38
[52] U.S. Cl. ........................... 364/419.19; 364/419.08
[58] Field of Search ...................... 364/419.01, 419.07, 364/419.1, 419.11, 419.12, 419.19, 419.08; 395/600

[56] References Cited

FOREIGN PATENT DOCUMENTS 0282721 2/1988 European Pat. Off. .
0378848 12/1989 European Pat. Off. .

OTHER PUBLICATIONS

Claudio L. Lucchesi, Tomasz Kowaltowski, Applications of Finite Automata Representing Large Vocabularies, Software-Practice and Experience, vol. 23(1), 15-30, (Jan. 1993).

Wells, C. J. et al., "Fast Dictionary Look-up for Contextual Word Recognition," *Pattern Recognition*, vol. 23, No. 5, pp. 501-508, 1990.

Hardwicke, J. J., et al., "Parallel access to an English dictionary," *Microprocessors and Microsystems*, vol. 15, No. 6, pp. 291-298, 1991.

Primary Examiner—Robert A. Weinhardt
Assistant Examiner—A. Bodendorf
Attorney, Agent, or Firm—Townsend and Townsend Khourie and Crew; Charles J. Kulas

[57] ABSTRACT

A method and apparatus for adding a word to a lexical transducer in a computer system. The invention allows a user of the computer system to specify a word to be added to the lexical transducer database. The lexical transducer represents words as ordered sequences of symbols, i.e., characters and morphological tags. "Upper" and "lower" symbols are associated with arcs. The arcs join states and form a path. Each path determines an upper and lower sequence of ordered symbols. The upper sequence of symbols represents a base form of a word and the lower sequence of symbols represents a surface form of the same word. The user adds a word to the lexical transducer by specifying a "model" word already existing in the lexical transducer, along with a new word that has surface forms analogous to the model word. The new word is added to the lexical transducer by sharing, as much as possible, the existing arcs of the path of the model word.

4 Claims, 4 Drawing Sheets

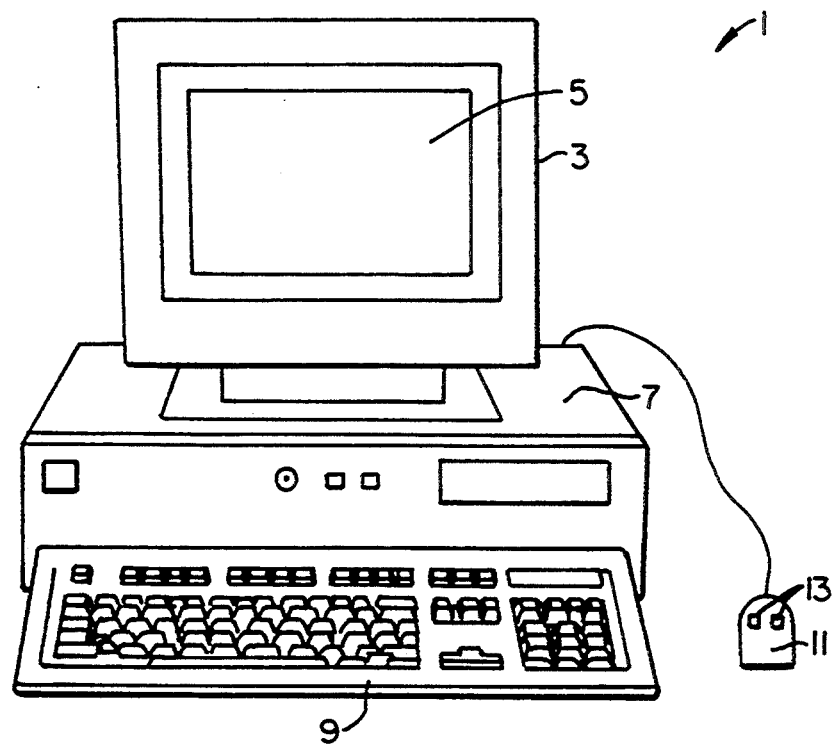
FIG. 1.
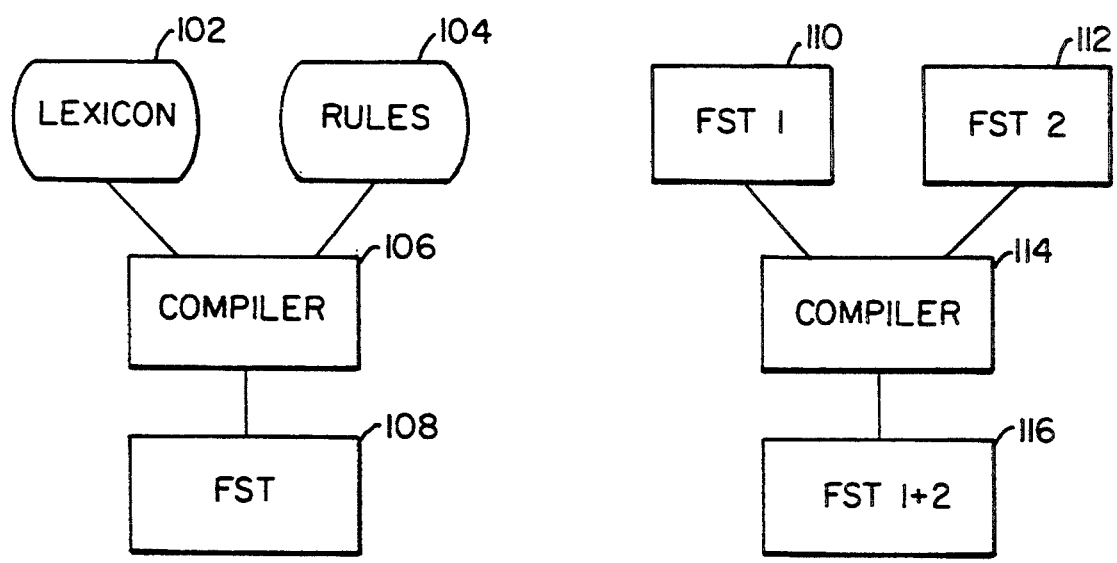
FIG. 2A.
FIG. 2B.

AUGMENTING A LEXICAL TRANSDUCER BY ANALOGY

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates generally to modifying a computer database and specifically to adding a word to a lexical transducer in a computer system.

Computers have commonly been used in language related applications. For example, text searching, spell checking, on-line dictionaries, speech recognition, automatic writing, etc., each involving representing and accessing words within a computer system. As is true in most computer applications, the manner in which data is represented within the computer (the "database") is a major factor in determining the speed, efficiency, and versatility of the application.

In order for a computer language application to be effective, the database employed by the application generally needs to be large. The database should include most of the "base" forms of words used in the language and also "surface" forms derived from the base forms of those words. For example, plural forms of singular words, verb forms of nouns, etc., must be represented if the database is to be a complete one. Surface and base forms of words should be associated with each other, so that, for example, a reference to the word "swim" (base form) will access forms such as "swam," "swum," "swims," "swimming" and "swimmer" (surface forms).

A database of word forms is created through a "compilation" process. This involves starting with base forms and generating the various surface forms by using grammatical rules. The application of rules to base forms to generate surface forms is complex and time-consuming because of the non-standard characteristics of language that require numerous rules to be applied. Often the rules have many exceptions or are limited in their application to different types of words. In addition to generating words, the words are translated into a computer-understandable representation and stored as the completed database. The steps of generation and translation are referred to as "compiling" and are performed by software called a "compiler."

Some compilers output a database in a specific form called a "finite state transducer" ("FST"). An FST is a finite state automaton in which state transitions (arcs) are labelled by a pair of symbols and not by a single symbol as in a simple finite state automaton (or, equivalently, finite state machine, "FSM"). A special form of an FST is a "lexical transducer" ("LT"). An LT is a specialized FST that maps base forms to inflected surface forms and vice versa.

It is desirable to provide an end user of the application with only the database and not the compiler to create the database. However, an end user often needs to modify the database. Most commonly, the user may wish to add a word to the database. Traditionally, this would mean that the user would have to define the word as new data to the compiler and execute the entire compilation process over again to end up with a database including that new word.

Accordingly, an invention which allows an end user to add to, or modify, an existing compiled database without performing a compilation procedure is desirable.

SUMMARY OF THE INVENTION

The present invention provides for adding a word to an LT without the requirement of a compilation procedure. A human user specifies a word to be added to the lexical transducer along with a "model" word which already exists in the LT. The model word is a word that has an analogous form to the words to be added so that "mapping" rules that are applicable to the model words may be equally applied to the word to be added.

The invention provides a procedure by which a user may add a new word to a lexical transducer. The LT represents word pairs where a first word in the pair is a base form of a given word and the second word in the pair is the surface form of the given word. The word pair is represented as a path in the LT. The path is made up of states connected by arcs. Each arc has an upper and lower symbol associated with it. The symbol may be null. By traversing from state to state, by means of the arcs, in a directed manner according to the structure of the LT, software of the present invention maps an upper word to a corresponding "lower" word from the upper and lower symbols obtained while traversing the arcs. The upper word is the base word in the pair while the lower word is the surface word in the pair.

In order to add a new word to the LT, the user specifies the new word along with a model word which already exists as a base form represented by a path in the LT and has analogous surface forms to those of the new word. The present invention then identifies at least one arc in the path representing the model word as a base form. Software of the present invention then uses this path, to create one or more new arcs connecting one or more states to represent the new word as an added base form to the LT. Thus, the path that represents the new word includes one or more arcs of the path of the model word.

BRIEF DESCRIPTION OF THE DRAWINGS

FIG. 1 is an illustration of a computer system for executing the software of the present invention;

FIG. 2A illustrates a first compilation procedure;

FIG. 2B illustrates a second compilation procedure;

DETAILED DESCRIPTION OF A SPECIFIC EMBODIMENT

Figure 3:
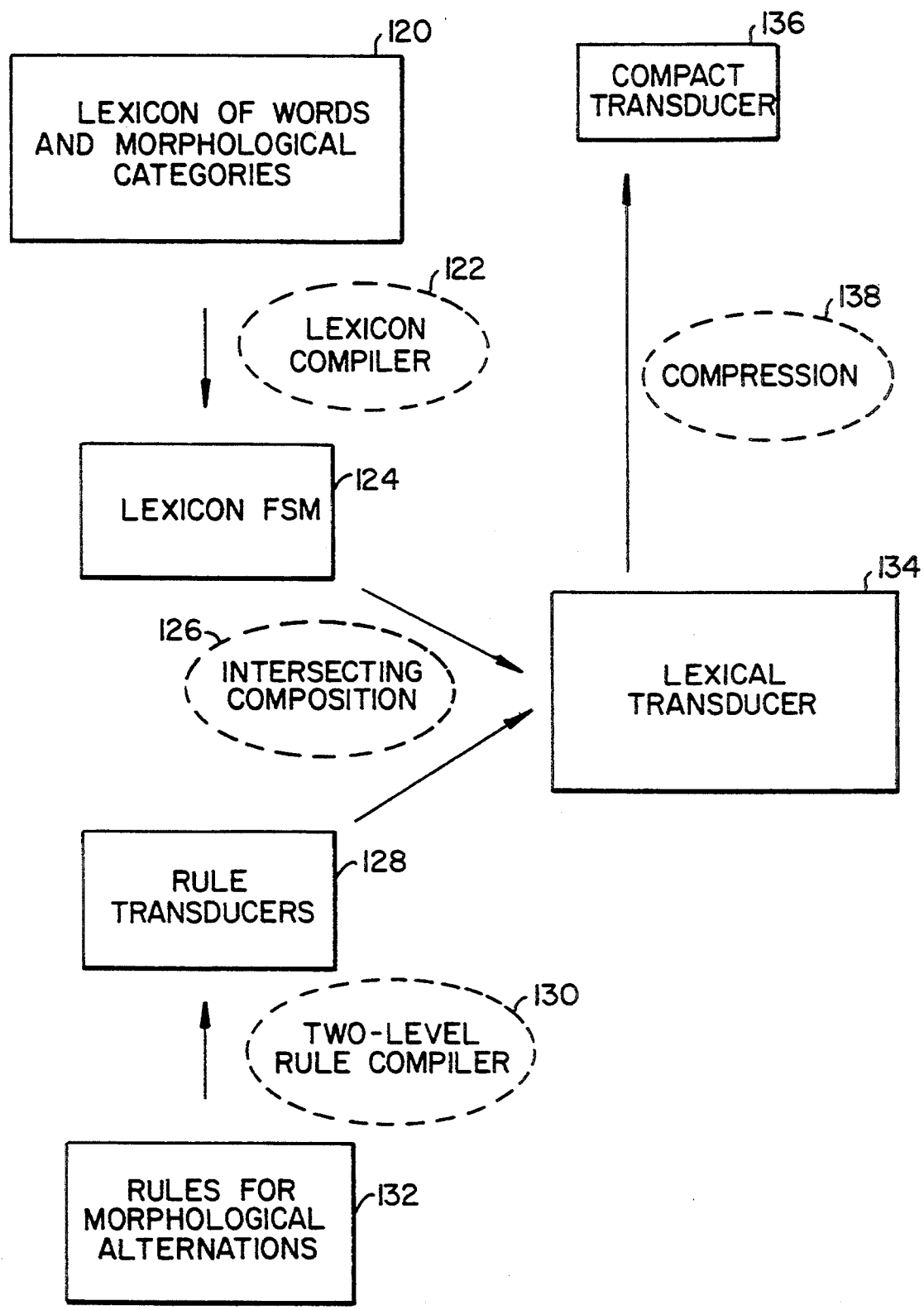
FIG. 3 illustrates a third compilation procedure.

FIG. 1 is an illustration of a computer system suitable for executing the software of the present invention. FIG. 1 depicts but one example of many possible computer types or configurations capable of being used with the software of the present invention. FIG. 1 shows a computer system 1 which includes a display device 3, a display screen 5, a cabinet 7, a keyboard 9 and a mouse 11. Mouse 11 and keyboard 9 are "user input devices." Other examples of user input devices are a touch screen, light pen, track ball, data glove, etc.

Mouse 11 may have one or more buttons such as buttons 13 shown in FIG. 1. Cabinet 7 houses familiar computer components such as disk drives, a processor, storage devices, etc. As used in this specification "storage device" includes any storage means used in connection with a computer system such as disk drives, magnetic tape, solid state memory, bubble memory, etc. Cabinet 7 may include additional hardware such as input/output (I/O) interface cards for to connecting external devices such as an optical character reader, external storage devices, other computers, or additional devices.

FIGS. 2A and 2B illustrate different ways that a compiler is used to create a database.

In FIG. 2A, a lexicon 102 is a collection of words to which rules 104 are applied in a compiler 106 to generate a database 108. Database 108 of FIG. 2A is a special form of a database called a "finite state transducer" ("FST"), to be described below. Database 108 includes the base form of the words in lexicon 102 along with surface forms derived from the base forms by application of rules 104. FIG. 2A is but one example of a compiler. Another form of compiler may merely act to "merge" two lexicons together to produce a database that includes both lexicons. The database output by the compiler, such as database 108, may be ordered, compressed, etc. The function of compiler 106 is to generate a complete lexical database for use in a language application program executing on a computer.

FIG. 2B illustrates a second type of compiler. In FIG. 2B, FST 110 and FST 112 are merged into a single FST 116 by compiler 114. The merging operation may be union, intersection, complementation or composition and the resulting structure may be determinized and minimized by the compiler to eliminate redundancies. A discussion of the compilation and use of lexical transducers in language processing applications may be found in co-pending application Ser. No. 07/916,576, filed Jul. 20, 1992, entitled "Finite State Transduction of Related Word-Forms For Text Indexing and Retrieval." Compilers are also discussed in the paper "Two-Level Morphology with Composition," by Lauri Karttunen, Ronald M. Kaplan, and Annie Zaenen; Xerox Palo Alto Research Center, and references therein. Both of these documents are hereby incorporated by reference as if set forth in full in this specification. Other schemes for compiling, other than those discussed herein, are possible.

A "finite state transducer" is a device for encoding sets of ordered-pairs of data. In general, an FST can be used to represent any "regular relation," generated from a finite lists of ordered pairs by Boolean operations such as concatenation, union, iteration, etc. Once the ordered pairs are encoded as an FST data structure, that structure is used by a computer to access a member of the pair, whereupon the other, associated, member is also readily accessed.

FIG. 3 illustrates a compilation procedure for generating a special form of FST called a "lexical transducer." In FIG. 3, lexicon 120 includes words and morphological information, such as "tags," that are associated with one or more words and describe a grammatical property of the word (e.g., past tense, plural, progressive, etc.). Lexicon compiler 122 receives lexicon 120, in the form of a text file, as input and converts it to a simple finite state machine ("FSM") 124. Rules 132 are represented as data in a computer system and describe how to derive surface forms from base forms of words. For example, a simple rule is to add the character "s" to a base word to get the plural form of the word. Rules 132 are input to rule compiler 130 which outputs rule transducers 128. Details on rule transducers may be found in the technical publication "Two-Level Rule Compiler," by Lauri Karttunen and Kenneth R. Beesley, Xerox Corporation, ISTL-92-2, October, 1992.

After lexicon FSM 124 and rule transducers 128 are generated, they are combined by process 126 which performs intersecting and composition steps. This results in lexical transducer 134 which may be compressed to result in compact transducer 136 by means of a compression method 138.

FIG. 3 is but one example of a general description of a compilation process to produce a lexical transducer. Other methods are possible which may omit some of the steps or objects of FIG. 3, or which may include additional steps or objects. The input to a compiler may be from a human user, from pre-defined and stored files, automatically generated by other computer programs, etc.

A "lexical transducer," as used in this specification, refers to a database where the representation of words is via a two-level finite state machine. Each word is represented by a "path" comprised of ordered "states" joined by "arcs." The path is traversed by traversing routines to yield the represented word. Each path is used to represent a base, or lexical, word and an associated surface form of the word. A lexical transducer is efficient in that the recognition and generation of known words does not require the application of any morphological rules. That is, if every surface form of a word is stored as an ordered pair with its base form, then all surface forms of the word may be accessed by accessing the base form. This allows for "bidirectional" access of word forms, i.e., from the base form to the surface form ("generating"), or from the surface form to the base form ("stemming").

Figure 4A:
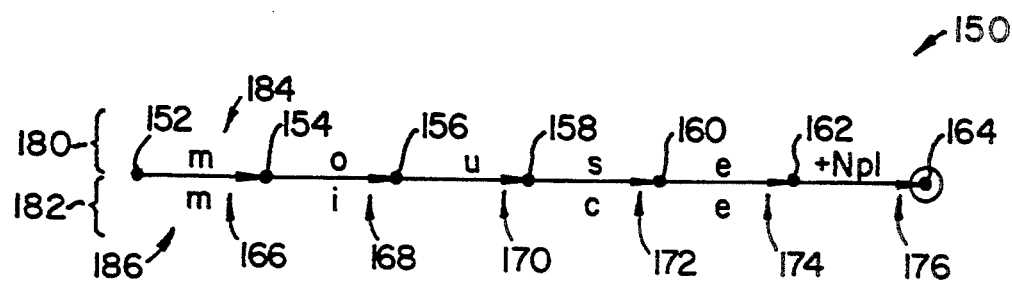
FIG. 4A is a first path diagram.

FIG. 4A shows an example of a path 150 in a lexical transducer. Path 150 includes states 152–164 shown as dots in FIG. 4A. Adjacent states such as state 152 and state 154, are connected by arcs such as arc 166. Similarly, states 154 and 156 are connected by arc 168. Thus, the collection of ordered arcs 166–176 connecting the first state, state 152, with the final state, state 164, comprises a path 150.

Each arc may have up to two symbols associated with it. A first symbol, an "upper" symbol, is shown above path 150 at 180. Lower symbols are shown at 182, below path 150. A symbol may be a character or a morphological "tag", discussed below. Thus, arc 166 has an upper symbol that is the character, "m," at 184, and has lower symbol, "m," at 186. Arc 168 has upper symbol "o" and lower symbol "i". The collection of states and arcs that make up a path is ordered so that a path defines an ordered sequence of upper and lower symbols. The ordered sequence, in turn, defines a series, or "string," of characters for an upper word and a lower word .

Software routines are used to retrieve a surface form of a word from a base form in a path. While the discussion here refers to retrieving the surface form given the base form, it is also possible to retrieve the base form given a surface form of a word, as will be apparent. In FIG. 4A, path 150 has upper word "mouse" and lower word "mice". In the preferred embodiment, the upper word is the base form while the lower word is the surface form. Thus, in FIG. 4A, "mouse" is the base form of the word represented while "mice" is the surface form of the word represented by path 150 of FIG. 4A.

Such a representation is useful, for example, in generating inflected forms of a base form. This allows a word search program to perform an efficient "intelligent" search to locate forms of words where the rules for forming surface forms of the base form are varied and numerous. The problem of deriving surface forms of a word from its base is magnified in languages such as French which include many inflected forms of a common canonical lexical representation.

Given an LT including path 150 of FIG. 4A, the method of "mapping" the base form "mouse" to the surface form "mice" employs software routines executing on a computer. The routines that access the lexical transducer to generate a word from a path are referred to as "traversing" routines.

The traversing routines are given a base form of a word and return surface forms of that word. For example, in FIG. 4A, where it is desired to find the plural noun form of the word "mouse", the traversing routine identifies paths within the lexical transducer that start with the symbol "m". In general, a state may have any number of arcs connected to it. These additional arcs are not shown in FIG. 4A, but the effect of their presence means that the traversing routine must make a decision at a state with two or more arcs emanating from it as to which arc to follow. The possibility of having more than one arc joined to a state allows arcs to be used in more than one path as discussed in detail below.

In order to perform the mapping of base to surface form the traversing routine starts at a first state such as state 152 of FIG. 4A. In the preferred embodiment, all paths start from a common state (the "initial state"). In this example, state 152 is the common state even though other paths are not shown in FIG. 4A. From the first state, an arc is sought with an upper symbol that matches the first character in the base word. In this case, the letter is "m" so that, from state 152, arc 166 is followed to state 154 because upper character 184, "m" is associated with arc 166 and matches the first character of the base word being matched.

Lower character 186, which also happens to be an "m" is retrieved and stored in a list. Lower symbols are obtained as the traversing proceeds and stored in the list in order to created the surface form of the word. Proceeding from state 154 to state 156, the upper character, "o" is matched and the lower character, "i" is obtained and stored in the list. The storing of upper and lower symbols within the lexical transducer, and the association of symbols with arcs can be by any means known in the art. In the existing prototype, the computer programming language "LISP" is used. This programming language provides a way to associate symbols with arcs by means of "lists" which are an integral part of the LISP programming language. The prototype is written in Common LISP. For greater efficiency, the software of the present invention can be implemented in "C" and other programming languages. A listing of source code used in the prototype is included attached to this specification at Appendix A.

Arc 170 is the next arc chosen by the traversing routine. Arc 170 has upper symbol, "u", and no lower symbol, or, rather, a lower symbol that is "null". As a result of traversing arc 170, no character is added to the list. Upon further traversal of the path, characters "c" and "e" are added to the list. At arc 176, symbol "+Npl" is encountered as an upper symbol. This is a morphological tag that represents information that the surface form associated with this path is a plural noun form of the base word. Because state 156 is marked as "final" the traversing routine terminates and the assembled surface form is returned as output.

Figure 4B:
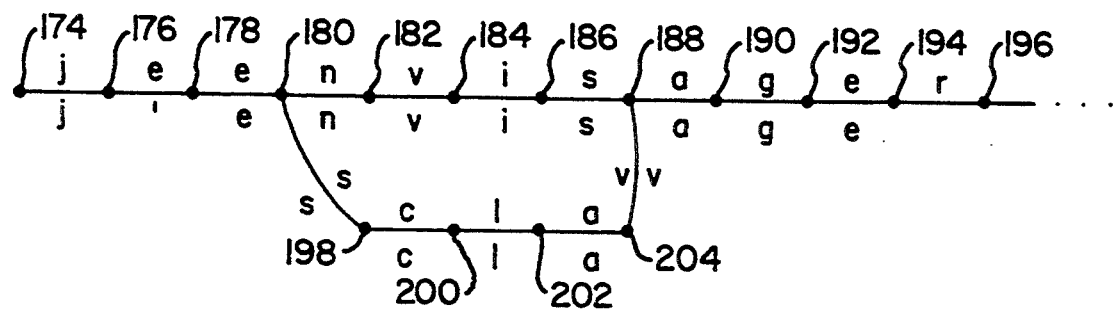
FIG. 4B is a second path diagram showing how arcs may be shared between paths.

As mentioned above, an arc may be used by more than one path. FIG. 4B illustrates the case where first and second paths include shared arcs.

FIG. 4B shows a portion (tags are omitted) of a first path (states 174–196) representing the first person singular present indicative form of the French verb "envisager" along with a second path (states 174–180, 198, 200, 202, 204, and 188–196) that represents the corresponding form of the verb "esclavager". Note that the second path shares arcs and states of the first path. Specifically, the second path uses states 174–180 (a common prefix) and states 188–196 (a common suffix or "tail") so that 7 arcs from the first path are shared. Further, a surface form of each of the verbs "envisager" and "esclavager" are accurately represented by the lower symbols of the paths as, respectively, "j'envisage" and "j'esclavage". English and French applications of the present invention use lexical transducers with about 226,000 and 5,000,000 word forms, respectively.

Figure 5:
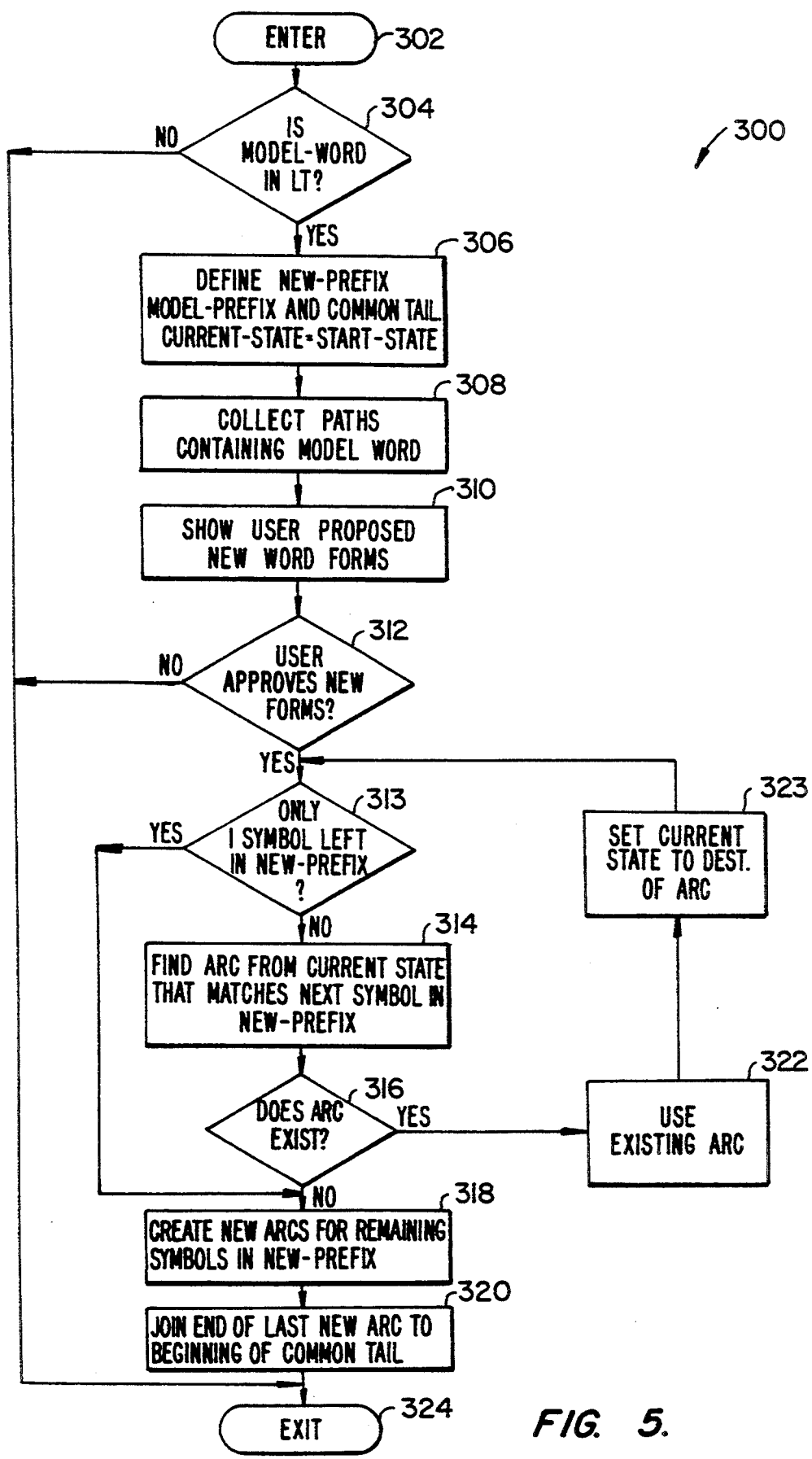
FIG. 5 is a flowchart of a routine that adds a word to the lexical transducer.

FIG. 5 is a flowchart of a word adding routine 300 that adds a new word to a lexical transducer given a model word that already exists in the lexical transducer. In a prototype embodiment, the routine described by the flowchart of FIG. 5 is actually implemented as several functions in the LISP computer programming language. However, for ease of discussion, the functions pertaining to the flowchart of FIG. 5 will be referred to as a single "routine." Any suitable computer programming language may be used to implement the flowchart of FIG. 5. Further, the flowchart gives merely the broad logical flow of the routine and an implementation may depart from the flowchart without departing from the scope of the invention. For example, it will be apparent to one of ordinary skill in the art that steps may be added, or deleted, from the flowchart without significantly changing the operation. Note that the structure of the LISP functions provided in Appendix A varies from the flowchart even though the LISP source code implements, essentially, the same procedural logic described in the flowchart.

The routine for adding a word to the lexical transducer is entered at step 302. It is assumed that parameters have been passed to the routine at this point so that the variable "MODEL-WORD" is assigned a character string (i.e., a word) as a value. Also, the variable "NEW-WORD" exists and is assumed to be assigned a value. A specific lexical transducer is also named as the database with which to work. In this example, let us assume that MODEL-WORD has a value of "spy", that NEW-WORD has a value of "cry", and that a lexical transducer has been named which includes the MODEL-WORD "spy" in a path as shown in FIG. 6A.

Figures 6A, 6B:
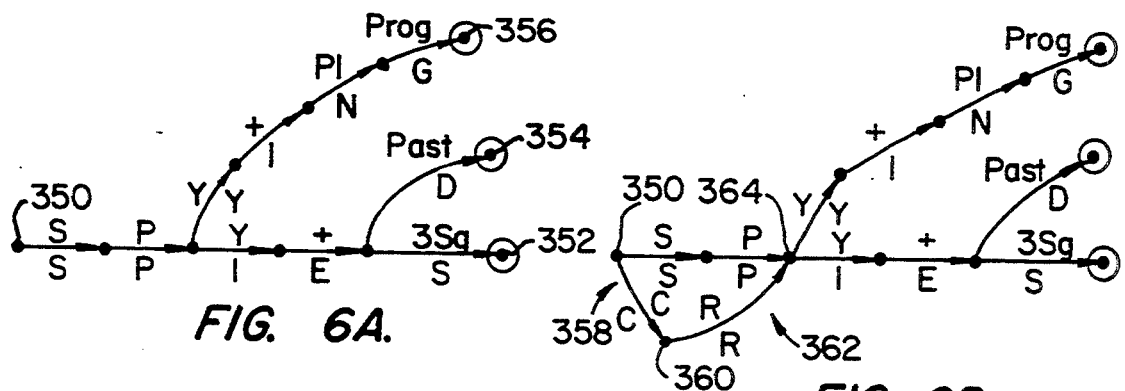
FIG. 6A is a third path diagram.
FIG. 6B is a fourth path diagram.

In FIG. 6A, three surface forms of the word "spy" are represented by three different paths. A first path starts at state 350 and ends at state 352. This first path maps the base form of the word "spy" to a third person singular surface form, "spies". Thus, the base form in the first path from state 350 to state 352 includes the tags "+" and "3Sg".

A second path starts at state 350 and ends at state 354. This second path maps the word "spy" to the surface form "spied" which is a past tense form of the word "spy" as indicated by the tag "Past".

Finally, a third path begins at state 350 and ends at state 356 to map the word "spy" in its plural progressive form to the surface form "spying".

As mentioned above, word adding routine 300 is entered at step 302. At step 304, a check is made to see whether MODEL-WORD exists as a path in the specified lexical transducer. If MODEL-WORD does not exist, routine 300 is exited at step 324. However, if MODEL-WORD does exist in the LT execution continues to step 306 where several data structures are defined for use later on in the routine.

Step 306 initializes data variables "NEW-PREFIX", "MODEL-PREFIX" and "CURRENT-STATE". Values for the variables NEW-PREFIX and MODEL-PREFIX are obtained first by determining a "common tail" between MODEL-WORD and NEW-WORD. The common tail is the end portion of the character string, or suffix, that is common to both the new and model words. In the present example, where MODEL-WORD is "spy" and NEW-WORD is "cry" the common tail is merely the single character "y".

Once the common tail has been determined, the variable NEW-PREFIX is assigned characters in NEW-WORD which precede the common tail in NEW-WORD. In this case, NEW-PREFIX would have the value "cr". Similarly, MODEL-PREFIX is assigned those characters preceding the common tail in MODEL-WORD, namely "sp". The variable "CURRENT-STATE" is used to indicate the current state in the traversal. CURRENT-STATE is initialized to a start-state that is, in this case, state 350 of FIG. 6A.

Execution of word adding routine 300 of FIG. 5 next proceeds to step 308 where paths containing MODEL-WORD in the upper string of symbols are identified. In the present example, step 308 identifies each of the three paths containing NEW-WORD "spy" in the upper sequence of symbols. Hereinafter, paths will be referred to in a shorthand notation where "path 350/352" refers to the path starting at state 350 and ending at state 352. Thus, the paths collected or identified at step 308 would be the three paths discussed above which include the word "spy" as an upper string of symbols, or base form, that is, path 350/352, path 350/354 and path 350/356. In normal use, a lexical transducer will be minimized so that all final states with only one arc attached will be combined into a single final state. For ease of discussion, the three final states of FIG. 6A are shown individually.

At step 310 routine 300 displays to the user a list of the proposed new word forms to be added to the lexical transducer. These new word forms are created for display by using the characters of NEW-PREFIX in place of the characters MODEL-PREFIX in each of the three paths collected at step 308. That is, the characters "cr" which are the value of NEW-PREFIX are substituted for the characters "sp" which is the value of MODEL-PREFIX, in each of the three paths. The remaining characters are obtained from the surface form of words represented by each of the three paths. Thus, the proposed new word forms displayed to the user will be "cries" a result of appending NEW-PREFIX to path 350/352; "cried" from path 350/354, and "crying" from path 350/356.

After the proposed new word forms are displayed at step 310, step 312 queries the user as to whether or not the new forms are correct. If the user does not approve the new forms, execution of routine 300 ends at step 324. However, if the user does approve the new forms then execution continues to step 313.

Step 313 is the first step in a loop that uses existing arcs in the prefix of the model word, if possible, in the path for the new word. At step 313, a check is made as to whether there is only one symbol in NEW-PREFIX that is yet to be added to the LT. If so, execution jumps to step 318 where the remaining symbol is associated with a new arc. Step 320 then joins the new arc to the beginning of the common tail.

In the present example, however, NEW-PREFIX is "cr" so that, upon first executing step 313, there is more than one symbol in NEW-PREFIX to be added to the LT. Thus, execution proceeds to step 314 where an arc from the CURRENT-STATE is sought that has an upper symbol which matches the current symbol in NEW-PREFIX. If such an arc exists, it is used in the path for the new word being added to the LT. When step 314 is first encountered, the "next" symbol in NEW-PREFIX is the first character in the string.

At step 316 a check is made as to whether a matching arc exists. In this case since the first character in NEW-PREFIX is "c" and state 350 of FIG. 6A does not have an arc with upper character "c" there is no match and execution proceeds to step 318.

At step 318 a new arc is created with origin at CURRENT-STATE, which is state 350 in FIG. 6A, that corresponds to the new symbol being added for NEW-PREFIX. This is shown in FIG. 6B by arc 358 which includes upper symbol "c" and lower symbol "c" and connects CURRENT-STATE 350 with new state 360.

At step 318 of routine 300, as shown in FIG. 5, any additional arcs necessary to add the remainder of new prefix to the existing paths are created. The only remaining character in NEW-PREFIX is the character "r" which is added as an upper symbol via the creation of a new arc 362 in FIG. 6B. New arc 362 has a lower symbol of "r".

At step 320 the last new arc is joined to an existing path structure at the point where the common tail begins. Thus, FIG. 6B shows that new arc 362 is joined at state 364 which already exists in the lexical transducer and was the beginning of the common tail as discussed above. Finally, execution of routine 300 ends and routine 300 is exited at step 324.

In the above discussion, it is seen that starting with paths defined in a lexical transducer as shown in FIG. 6A, the word adding routine 300 creates new arcs as shown in FIG. 6B to add a new word "cry" to the lexical transducer based on an existing model word "spy", for which there are one or more paths in the LT. The use of one or more existing arcs in existing paths in the LT to define a new word makes use of similarities, or analogies, in word forms so that a user may add a new word to an existing LT that "behaves" similarly to an existing word with which the user is familiar. This provides an efficient and easy to use user interface and does not require the user to go through the lengthy compilation task discussed above. Further, the present invention conserves storage space in that existing arcs and their associated upper and lower symbols are used whenever possible. In the example above, the addition of base word "cry" allows access to its surface forms of "cries" "cried" and "crying" with the addition of only two new arcs and one state.

In the discussion above in connection with the flowchart with routine 300 of FIG. 5, steps 322 and 323 were not executed since symbols in NEW-PREFIX and MODEL-PREFIX were not the same. In order to discuss steps 322 and 323, we assume that the lexical transducer includes paths as shown in FIG. 6B after the addition of the word "cry" as described. For purposes of this new example, we assume that the new word to be added is "copy". Thus, upon entry of routine 300, NEW-WORD is set to "copy" MODEL-WORD is set to "cry", and a lexical transducer is selected which includes the paths shown in FIG. 6B. At step 306, NEW-PREFIX will be set to "cop". The variable MODEL-PREFIX will be set to "cr". The common tail is again the single character "y" and CURRENT-STATE is again state 350.

At step 314, an arc is sought that matches the next symbol in NEW-PREFIX. Since, in this example, the next symbol is a "c" arc 358 is selected and the check at step 316 as to whether an arc exists is met. Thus, execution proceeds to step 322 where the selected arc of the prefix for the model word is used in the path for the new word.

Next, step 323 is executed which sets CURRENT-STATE to the destination state (state 360) of the selected arc and the loop is continued at step 313 to process the next character in NEW-PREFIX. At step 314, an arc is sought that matches the second symbol from NEW-PREFIX. In this case, the next symbol in NEW-PREFIX is the character "o" and the only arc from state 360 is arc 362 which has the upper character "r". Thus, the check at 316 fails and execution proceeds to step 318 where, as before, a new arc for the unfound arc is created to add a symbol to the existing LT.

Figure 6C:
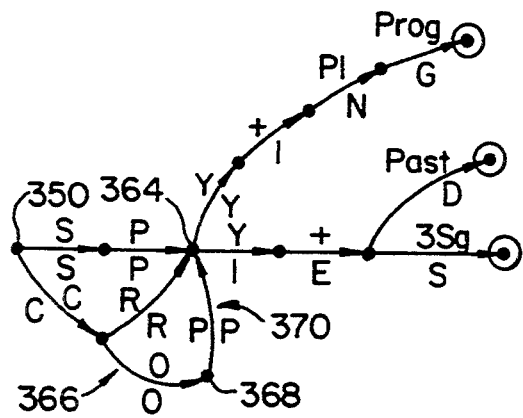
FIG. 6C is a fifth path diagram.

This is shown in FIG. 6C where new arc 366 has been added to the existing paths shown in FIG. 6B. Arc 366 has upper symbol "o" and lower symbol "o". Also, new state 368 has been created as a destination state for arc 366. Similarly, new arc 370 is created to include upper symbol "p" and lower symbol "p". At step 320, arc 370 is joined to state 364 which is the beginning of the common tail. Execution then terminates and the routine is exited at step 324.

Thus, it is seen that where beginning symbols in the prefix of a new word match the beginning symbols in an existing model word, arcs defining those matching symbols are used in a path that adds the new word to the LT.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for storing a word in a database in a computer system, the computer system including a user input device, a storage device and a processor, wherein the database is stored in the storage device and includes a model word represented as a first path within the database, wherein a path includes states joined by arcs, wherein each arc is associated with upper and lower symbols, wherein each symbol may be a letter, tag or null, the first path thereby defining an upper sequence of ordered upper symbols and a lower sequence of ordered lower symbols, wherein the upper sequence defines a lexical form of the model word and the lower sequence defines a surface form of the model word, the method comprising the steps of:
    (a) accepting signals from the user input device to specify a new word as one or more new symbols to be added to the database;
    (b) using the processor to identify at least one arc in the first path, wherein a symbol associated with the identified arc matches a new symbol in the new word; and
    (c) using the processor to add states and arcs to the database to represent the new word as a new path, wherein the new path includes the identified arc.

2. The method of claim 1 wherein:
    in step (a), the new symbols are letters that spell the surface form of the new word;
    in step (b), at least one letter in the new word is matched with a letter in the lower sequence of the first path; and
    in step (c), the new path defines a new upper sequence that represents a lexical form of the new word, and the new path defines a new lower sequence that represents the surface form of the new word.

3. An apparatus for adding a word to a database, the apparatus comprising a computer system, the computer system including a user input device, storage device, and a processor, the database including a model word represented as a first path, wherein a path includes states joined by arcs, wherein each arc is associated with upper and lower symbols, wherein each symbol may be a letter, tag or null, the first path thereby defining an upper sequence of ordered upper symbols and a lower sequence of ordered lower symbols, wherein the upper sequence represents a lexical form of the model word and the lower sequence represents a surface form of the model word, the apparatus further comprising:
    user input means for accepting signals to specify a new word to add to the database, wherein the new word comprises one or more new symbols;
    identifying means for identifying at least one arc in the first path, wherein the identified arc is associated with a symbol that matches a new symbol; and
    path construction means for adding states and arcs to the database to represent the new word as a new path, wherein the new path includes the identified arc.

4. In a computer system, a method for creating and modifying a lexical transducer, the computer system including a user input device, storage device, and a processor, the method comprising the steps of:
    inputting a lexicon comprising one or more words into the computer system;

inputting one or more grammatical rules into the computer system;

using the processor to compile the lexicon and grammatical rules into a lexical transducer, wherein words are represented in the lexical transducer as paths, wherein each path comprises one or more arcs in an ordered sequence, wherein each arc has an associated upper symbol and lower symbol, wherein a base form of a word is represented in the ordered sequence of upper symbols associated with the ordered sequence of arcs in a given path, wherein a surface form of the base form of the word is represented in the sequence of lower symbols associated with the ordered sequence of arcs in the given path, and wherein a first path represents a model word as the base form for the first path;

accepting signals from the user input device to specify a new word, wherein the new word comprises an ordered sequence of one or more symbols to be added to the database;

accepting signals from the user input device to specify the model word;

using the processor to identify at least one arc in the first path, wherein a lower symbol associated with the identified arc matches a symbol in the new word; and using the processor to add at least one arc to the lexical transducer to represent the new word as an ordered sequence of upper symbols associated with arcs in the new path, wherein the new path includes the identified arc.

* * * * *